United States Patent Office 3,143,949
Patented Aug. 11, 1964

3,143,949
PHOTOGRAPHIC EXPOSURE APPARATUS
Dexter P. Cooper, Jr., Lexington, and Arthur J. Sable, Boston, Mass., assignors to Polaroid Corporation, Cambridge, Mass., a corporation of Delaware
Filed Nov. 29, 1961, Ser. No. 155,678
4 Claims. (Cl. 95—77.5)

This invention relates to photographic apparatus and, more particularly, to apparatus including a source of illumination for photographically exposing a photographic image-recording medium during movement thereof through said apparatus.

This application is concerned with photographic apparatus, such as copying devices, which incorporate a light source for exposing a photographic image-recording medium as the latter is moved through the apparatus relative to the light source. More specifically, this application is concerned with document-copying apparatus of the type shown and described, for example, in U.S. patent application, Serial No. 133,397, filed August 23, 1961, in the names of E. H. Land et al., comprising an electric lamp as a light source and a generator for supplying current to operate the lamp. In this apparatus, the recording medium is moved and the generator is operated simultaneously by the same driving means, so that any change in speed of movement of recording material is accompanied by a simultaneous and equal change in speed of operation of the generator. The components of the generator-lamp circuit are selected to produce a predetermined optimum exposure when the recording medium is moved at a predetermined optimum speed. While the output of the generator and, hence, the brightness of the lamp is a function of the speed at which the generator is operated (and the film is moved), changes in lamp brightness are only partially compensated for by changes in speed of film movement because the generator output potential is a substantially linear function of generator speed but lamp brightness is an exponential function of the voltage impressed across the lamp. The lamp voltage versus brightness curve is exponential in character so that changes in the exposure due to changes in the generator speed are magnified out of proportion to the corrective influence of similar changes in speed of movement of the recording medium.

An object of the invention is to provide photographic apparatus of the type described, including a lamp, an alternating current generator, and means for linearizing, over a substantial range of operating speeds, the relationship between the speed at which the generator is operated and the recording medium is moved, and the brightness of the lamp.

Another object of the invention is to provide photographic apparatus of the foregoing type in which an inductive reactance is incorporated in the generator lamp circuit to produce a voltage versus speed (generator) characteristic which is balanced against the exponential characteristic of lamp voltage versus brightness to give a speed versus brightness relationship which is substantially linear over a predetermined range of speeds.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
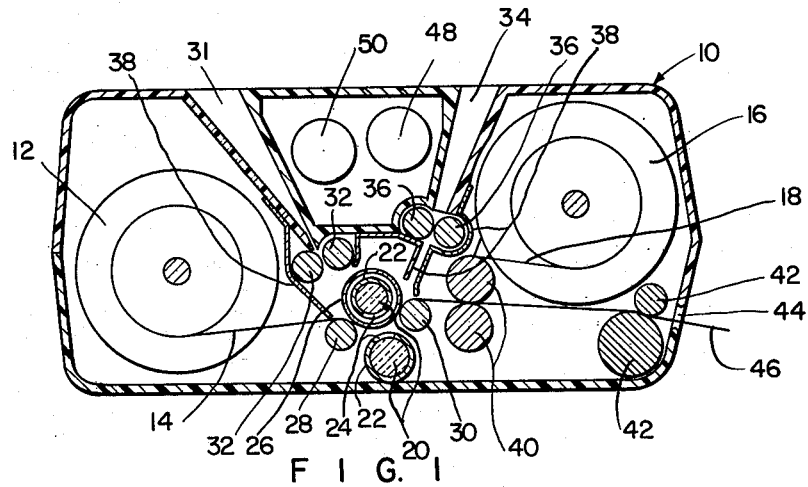
FIGURE 1 is a somewhat schematic sectional view illustrating photographic apparatus incorporating the invention.

Reference is now made to FIGURE 1 of the drawings wherein there is illustrated, by way of example, one form of document-copying apparatus incorporating the invention. This apparatus is of the type described in greater detail in the aforementioned Land et al. application and comprises a housing 10 for enclosing the components of the apparatus. Mounted within housing 10 are a first spool 12 for holding a supply of a photographic image-recording medium 14 and a second spool 16 for holding a supply of a second or print-receiving sheet 18 which is superposed with the image-recording medium during processing of the latter, preferably for the purpose of forming a positive transfer print which is carried by the second sheet.

The apparatus, in the form shown, includes two sources of illumination for exposing the recording medium in conjunction with an original to be copied, during movement of the recording medium and original in superposition relative to and past the source of illumination. The light sources include light conductive tubes or bars 20, each at least equal in length to the width of recording medium 14, extending transversely of the direction of the recording medium and positioned on opposite sides of the path of the recording medium during exposure thereof. Each of bars 20 is capable of conducting light by internal reflection and is enclosed in a tube 22 formed of a light opaque material and having an axial slot 24 through which light is emitted from the tube. Electric lamp (not shown), preferably of the incandescent type, is located at an end of each of bars 20 for introducing light into the bar; and a portion of the peripheral surface of each bar lying opposite slot 24 is roughened in such a manner as to reflect light transmitted by the bar from the bar through slot 24 in tube 22. For details of constructions and arrangements of light-conducting bars 20 and tubes 22, reference may be had to copending U.S. patent application Serial No. 133,399 filed August 23, 1961 in the names of Gold et al. and Serial No. 155,677, filed November 29, 1961 in the names of Nicholas Gold et al., this last application now being abandoned.

Means are provided for conducting the image-recording medium and original in superposition past and between the light sources in order to effect the exposure of the image-recording medium. The two light sources are provided for use in the alternative in order to subject the recording medium to either a direct exposure or to a reflex type of exposure. In the former, a light for exposing the recording medium is transmitted through the original to the recording medium; and in the latter type of exposure, light is directed through the recording medium to the original and is reflected back to the recording medium to produce a differential exposure therein. The means for guiding the recording medium and original during exposure comprise a light transmitting tube 26 mounted in surrounding relation to the uppermost tube 22 for rotation with respect to the latter. Tube 26 is supported by a pair of guide rolls 28 and 30 mounted with their axes substantially parallel to the axis of tube 26 and bar 20 in position to engage tube 26 at lines spaced from one another around the periphery of tube 26. Image-recording medium 14 is guided from spool 12 between guide roll 28 and tube 26 around the periphery of the tube and between the latter and guide roll 30 and is supported against the periphery of tube 26 by the two guide rolls. The original to be copied is introduced between the recording medium and tube 26 at the bite of the tube and guide roll 28 and is retained during exposure between the recording medium and the tube.

As a means for introducing the original into the apparatus, the upper portion of housing 10 is provided with a convergent inlet passage 31 which extends toward the bite of tube 26 and guide roll 28. At the inner end of passage 31 there is provided a pair of inlet feed rolls 32 which engage the original as it is introduced through passage 31 and are rotated to feed the leading end of the original between the recording medium and tube 26 at the bite of the latter and guide roll 28. Means are also provided for feeding the original from the apparatus following exposure of the original, and this means comprises an exit passage 34 in housing 10 and a pair of exit feed rolls 36 positioned to engage the original as it is advanced from between tube 26 and the recording medium at the bite of the tube and guide roll 30. The recording medium is moved through the apparatus, and the inlet and exit feed rolls are driven by the same means so that feeding of the original into position for exposure, and exposure and feeding the original from the apparatus occur substantially automatically during advancement of the image-recording material through the apparatus. Light-sealing members, designated 38, are provided in association with passages 31 and 34 and the inlet and exit feed rolls to prevent the emission of light through the passages and to guide the original from the inlet feed rolls into superposition with the holding medium and from superposition with the recording medium into engagement with the exit feed rolls.

The apparatus shown includes means for processing the exposed image-recording medium to produce a positive copy of the original. This processing, in a preferred form, comprises a silver halide diffusion-transfer process by which a positive silver transfer image is formed on second sheet 18 from a latent image in the image-recording medium, which preferably includes as the photosensitive material thereof a gelatino silver halide emulsion. This process is effected by superposing an exposure area of the recording medium with an area of second sheet 18 and distributing a processing fluid between and in contact with the superposed sheets. For examples of processing fluids, the materials comprising the two sheets, and the specific process performed thereby, useful in the apparatus shown, reference may be had to U.S. Patents No. 2,543,181 issued February 27, 1951, and No. 2,662,822 issued December 15, 1953.

The means for superposing the image-recording and second sheets comprises a pair of juxtapositioned pressure-applying rolls 40 positioned adjacent guide roll 30. Recording medium 14 extends from the bite of tube 26 and guide roll 30 between pressure-applying rolls 40 while second sheet 18 is guided from spool 16 around the uppermost pressure applying roll and thence into superposition with the recording medium between the pressure-applying rolls. The processing fluid is dispensed by means (not shown), described in detail in the aforementioned Land et al. application, onto the portion of the image-recording medium which extends between guide roll 30 and the pressure-applying roll and is distributed between and in contact with the two sheets by movement of the sheets in superposition between the pressure-applying rolls.

The two sheets are retained in superposition by the processing fluid distributed therebetween and are advanced in superposed relation from the pressure-applying rolls to a pair of outlet rolls 42 and thence through an outlet passage 44 in housing 10 adjacent rolls 42. For processing to occur, the sheets are required to remain in superposition for a predetermined period which, in practice, is insured by movement of the superposed sheets at a controlled rate through the distance between rolls 40 and rolls 42.

The apparatus in the form shown may be designed for manual operation; that is, by grasping the end designated 46 of the superposed sheets projecting through passage 44 and pulling the sheets through and from the apparatus. The apparatus accordingly includes a transmission mechanism coupled, for example, with either the pressure-applying rolls or outlet feed rolls 42, for driving inlet feed rolls 32 and exit feed rolls 36. The lamps, comprising the light sources as previously noted, are supplied with current from a generator designated 48 which is also driven by the transmission and receives its motive power from the advancement of the sheets through the apparatus. The generator is designed to produce alternating current at a voltage which is a direct function of the speed at which the generator is operated; and since lamp brightness is a function of the generator voltage, and exposure of the image recording means is a function of both lamp brightness and speed of movement of the image-recording medium, in the preferred form of the apparatus, a governor of some type is provided coupled with the transmission for controlling the speed at which the generator is operated and the recording medium is moved relative to the light source during exposure. The governor may be of the electromagnetic type or it may comprise a mechanical governor designated 50 coupled with the transmission.

The governor, like most devices of this type, is designed to limit the speed of operation of the device with which it is coupled and because operation of the apparatus is manual, permits the apparatus to be operated over a range of speeds which, for the most part, are less than the speed limit set by the governor. Accordingly, the governor is preset to limit the speed of the generator and movement of the recording medium to a predetermined optimum which will result in a good exposure of the photosensitive material, which exposure is a function of the lamp brightness and speed of movement of the image-recording medium.

Figure 2:
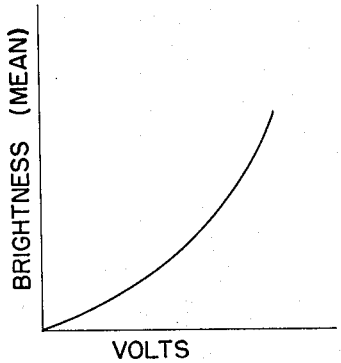
FIG. 2 shows a curve expressing the relationship between lamp brightness and voltage.
Figure 3:
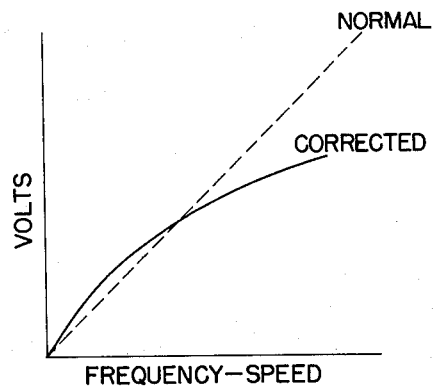
FIG. 3 shows curves expressing the relationships between generator voltage and frequency.

It has been found that lamp brightness is an exponential function of the voltage across the lamp so that the curve shown in FIG. 2 expressing the relationship between lamp brightness and voltage is asymptotic. Because the curve shown in FIG. 3 (as a broken line), expressing the relationship between the voltage output of the generator and the speed at which the generator is operated (and the recording medium is advanced) is normally linear, changes in lamp brightness attendant with changes in speed of movement of the recording medium are not compensated for by the changes in speed of movement of the recording medium.

Figure 4:
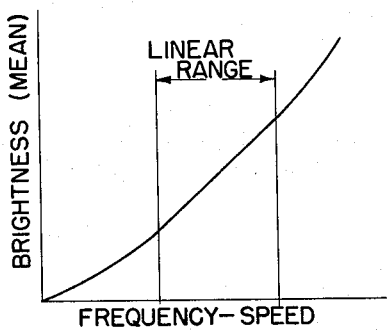
FIG. 4 shows a curve expressing the linearized relationship between lamp brightness and frequency.

According to the invention, the combined curve shown in FIG. 4 expressing the relationship between lamp brightness and speed at which the recording medium is moved and the generator is operated, can be made substantially linear over a predetermined range including the speeds at which the apparatus is normally operated. This is accomplished by incorporating an inductive reactance in the generator lamp circuit. The reactance, of course, varies in proportion to changes in the frequency of the generator so that the curve shown in FIG. 3 (by a solid line), expressing the relationship between voltage and frequency becomes parabolic in character rather than linear, and this may be balanced against the lamp brightness versus voltage characteristic to produce the allover brightness versus frequency characteristic of FIG. 4. The range of frequencies and speeds at which the brightness versus frequency curve is linear may be substantial and extend, for example, from 75 percent to 100 percent of a nominal optimum operating frequency which is determined by the governor. The inductive reactance may comprise, for example, a winding of the generator, and/or a separate coil serially connected with the output of the generator and the lamp. The desired overall curve of speed versus brightness which is linear over a substantial range is achieved by adjusting the parameters of the system, for example, so that the inductive reactance is about 1.6 times the total circuit resistance, including the resistance of the generator, lamp, rheostat and inductor resistance, at a frequency which corresponds to the mid-point of the frequency range over which compensation is desired. The rheostat mentioned above is provided for the purpose of controlling lamp brightness and thereby making adjustments necessitated by the nature of the original to be copied and/or the sensitivity of the image-recording medium being employed.

Since the apparatus is operated manually and the optimum speed is controlled by a governor, the usual practice is for the operator to accelerate the movement of the recording medium until the force required to accelerate the speed of movement of the recording medium increases rapidly as a result of a retarding force exerted by the governor. This mode of operation is characteristic of a governed, manually-operated device so that such devices are usually operated within a range of speeds which is less than the speed for which the governor is designed, since it is difficult for a person to maintain a constant speed. The brightness compensating means of the invention insures uniformly constant exposure of the recording medium as long as the latter is moved through the apparatus at a speed which is within a range of speeds sufficiently large to accommodate all but the most extreme conditions.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Photographic apparatus comprising, in combination, an electric lamp having a brightness which is an exponential function of the voltage applied to said lamp; an alternating current generator coupled with said lamp for supplying current to said lamp at a frequency and voltage proportional to the rate at which said generator is operated; drive means for moving photographic image-recording material through said apparatus relative to said lamp to effect the exposure of said material by light from said lamp and for operating said generator; speed governing means coupled with said drive means for regulating the speed of movement of said material and operation of said generator within a predetermined range of speeds; and frequency responsive impedance means electrically coupled with said lamp and said generator for so varying the impedance to flow of current from said generator to said lamp as to linearize the relationship between the brightness of said lamp and the voltage impressed across said lamp throughout a predetermined range of alternating current frequencies whereby variations in lamp brightness and rate of movement of said image-recording material compensate for one another to insure a substantially constant exposure of said material during movement of said material relative to said lamp at a rate within said predetermined range of speeds.

2. Photographic apparatus comprising, in combination:
    an electric lamp having a brightness which is a function of the applied voltage;
    means for moving a photosensitive sheet through said apparatus relative to said lamp for exposing said sheet to light from said lamp;
    an alternating current generator for supplying current to said lamp at a frequency and voltage proportional to the rate at which said generator is operated;
    said generator and said means for moving said sheet being coupled with one another so that the rates of movement of said sheet and operation of said generator vary concurrently and in the same proportions; and
    an inductive reactance electrically coupled with said lamp and said generator for varying the impedance to flow of current from said generator to said lamp to linearize the relationship between the brightness of said lamp and the rate of movement of said sheet throughout a range of sheet movement rates and insure substantially uniform exposure of said sheet during movement of said sheet at rates within said range.

3. The photographic apparatus of claim 2 in which the brightness of said lamp is an exponential function of the voltage applied to said lamp.

4. The photographic apparatus of claim 2 in which said inductive reactance is equal to approximately 1.6 times the total resistance of the circuit comprising said generator, reactance and lamp at a frequency approximately midway in said range of sheet movement rates.

References Cited in the file of this patent

UNITED STATES PATENTS

| | | |
|---|---|---|
| 1,400,819 | Higgins | Dec. 20, 1921 |
| 1,417,710 | Ballman | May 30, 1922 |
| 2,732,778 | Limberger | Jan. 31, 1956 |
| 2,835,179 | Fairbank | May 20, 1958 |